(12) United States Patent
Zhang

(10) Patent No.: US 12,744,279 B2
(45) Date of Patent: Sep. 22, 2026

(54) BATTERY PACK ENCLOSURE HAVING INNER AND OUTER WALLS

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 875 days.

(21) Appl. No.: 18/176,657

(22) Filed: Mar. 1, 2023

(65) Prior Publication Data

US 2024/0297398 A1 Sep. 5, 2024

(51) Int. Cl.
*H01M 50/367* (2021.01)
*H01M 50/242* (2021.01)

(52) U.S. Cl.
CPC ....... *H01M 50/367* (2021.01); *H01M 50/242* (2021.01); *H01M 2220/20* (2013.01)

(58) Field of Classification Search
CPC .................................................... H01M 50/367
See application file for complete search history.

(56) References Cited

U.S. PATENT DOCUMENTS 3,510,360 A 5/1970 Steiner
5,563,006 A * 10/1996 Von Benda ....... H01M 10/3909 429/102
10,062,937 B2 8/2018 Kerspe et al.
2017/0237054 A1 8/2017 Mast
2021/0320368 A1* 10/2021 Huang ................ H01M 50/242
2023/0231264 A1* 7/2023 Jeon ....................... H01M 50/30 429/87
2024/0075820 A1* 3/2024 Hoffman ............. H01M 50/367
2024/0079717 A1* 3/2024 Dunlap ................... B60L 50/66

FOREIGN PATENT DOCUMENTS

CN 111668410 A * 9/2020 ............. A62C 37/00
CN 114204183 3/2022
GB 738985 10/1955
JP 4596898 10/2010
WO WO-2024168368 A1 * 8/2024 .......... H01M 50/249

OTHER PUBLICATIONS

Machine translation of CN 111664810 (no date) (Year: 0000).*

* cited by examiner

*Primary Examiner* — Amanda C. Walke
(74) *Attorney, Agent, or Firm* — David B. Kelley; Carlson, Gaskey & Olds, P.C.

(57) ABSTRACT

A traction battery pack assembly includes an enclosure assembly that houses a plurality of battery cells. The enclosure assembly has an inner wall and an outer wall spaced from the inner wall. A method of enclosing battery cells within a battery pack includes communicating vent byproducts to an open area between an inner wall of a battery pack enclosure and an outer wall of the battery pack enclosure.

20 Claims, 4 Drawing Sheets

BATTERY PACK ENCLOSURE HAVING INNER AND OUTER WALLS

TECHNICAL FIELD

This disclosure relates generally to an enclosure of a battery pack and, more particularly, to an enclosure having inner and outer walls.

BACKGROUND

A traction battery pack of an electrified vehicle can include groups of battery cells arranged in one or more cell stacks. From time to time, pressure and thermal energy within one or more of the battery cells can increase. In response, gases and debris can be released from those battery cells. The battery cells can be housed within an enclosure.

SUMMARY

In some aspects, the techniques described herein relate to a traction battery pack assembly, including: an enclosure assembly that houses a plurality of battery cells, the enclosure assembly having an inner wall and an outer wall spaced from the inner wall.

In some aspects, the techniques described herein relate to a traction battery pack assembly, further including a plurality of struts spanning between the inner wall and the outer wall.

In some aspects, the techniques described herein relate to a traction battery pack assembly, wherein the plurality of struts are perforated struts.

In some aspects, the techniques described herein relate to a traction battery pack assembly, wherein the plurality of struts extending non-perpendicularly from the inner wall and the outer wall.

In some aspects, the techniques described herein relate to a traction battery pack assembly, wherein the plurality of struts are provided by a corrugated sheet of material.

In some aspects, the techniques described herein relate to a traction battery pack assembly, wherein the corrugated sheet of material is perforated.

In some aspects, the techniques described herein relate to a traction battery pack assembly, wherein the corrugated sheet of material is secured directly to the inner wall and the outer wall.

In some aspects, the techniques described herein relate to a traction battery pack assembly, wherein the corrugated sheet of material is welded to the inner wall and the outer wall.

In some aspects, the techniques described herein relate to a traction battery pack assembly, further including a plurality of cell stacks held within the enclosure assembly.

In some aspects, the techniques described herein relate to a traction battery pack assembly, wherein the enclosure assembly includes an enclosure cover secured to an enclosure tray, wherein the inner wall and the outer wall are portions of the enclosure tray.

In some aspects, the techniques described herein relate to a traction battery pack assembly, further including an inner vent provided within the inner wall, the inner vent configured to communicate vent byproducts from at least one of the battery cells within the plurality of battery cells to a venting passageway between the inner wall and the outer wall.

In some aspects, the techniques described herein relate to a traction battery pack assembly, further including an outer vent provided in the outer wall, the venting passageway configured to communicate the vent byproducts from the inner vent to the outer vent.

In some aspects, the techniques described herein relate to a traction battery pack assembly, further including a plurality of struts extending between the inner wall and the outer wall, the vent byproducts passing through perforations in the plurality of struts when the vent byproducts are communicated from the inner vent to the outer vent.

In some aspects, the techniques described herein relate to a method of enclosing battery cells within a battery pack, including: communicating vent byproducts to an open area between an inner wall of a battery pack enclosure and an outer wall of the battery pack enclosure.

In some aspects, the techniques described herein relate to a method, wherein the vent byproducts are released from at least one battery cell housed within the battery pack enclosure.

In some aspects, the techniques described herein relate to a method, further including spanning across the open area from the inner wall to the outer wall with a plurality of struts.

In some aspects, the techniques described herein relate to a method, further including communicating the vent byproducts through a plurality of perforations in the plurality of struts.

In some aspects, the techniques described herein relate to a method, further including receiving the vent byproducts within the open area from an inner vent within the inner wall, and expelling the vent byproducts from the open area through an outer vent within the outer wall.

In some aspects, the techniques described herein relate to a method, wherein the inner vent and the outer vent are on opposite sides of the battery pack enclosure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary enclosures for a battery pack. The enclosure has at least an inner wall and an outer wall. Areas between the inner and outer walls can be used to communicate vent byproducts expelled from battery cells within the enclosure.

Figure 1:
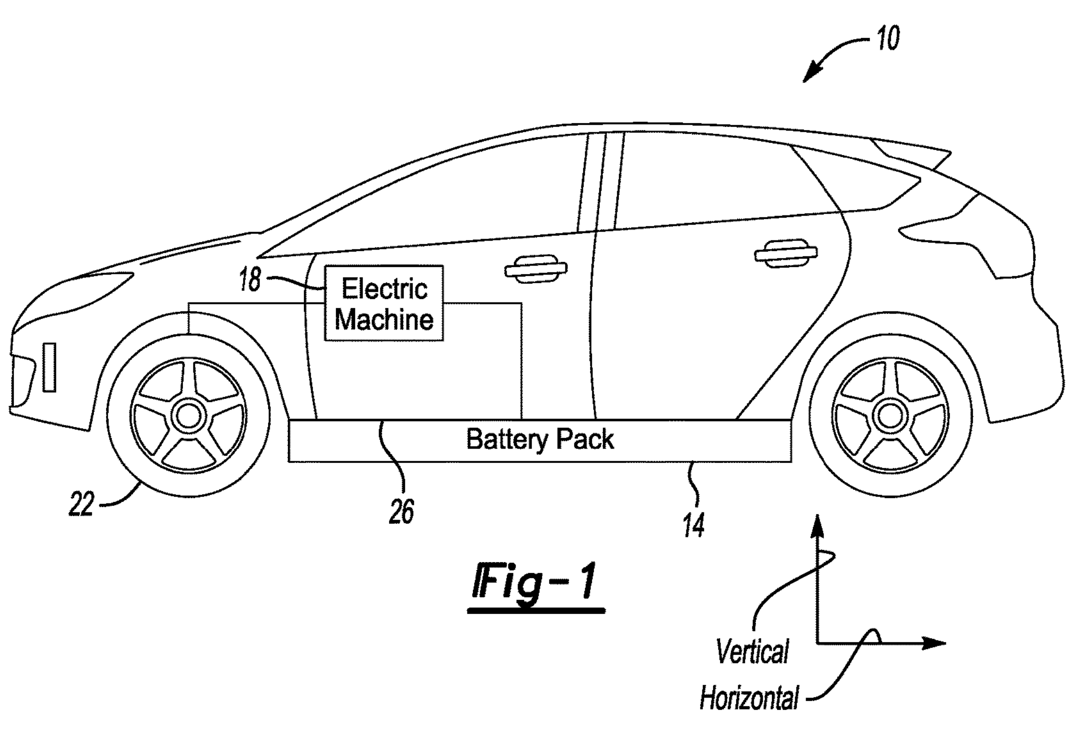
FIG. 1 illustrates a side view of an example electrified vehicle.
Figure 2:
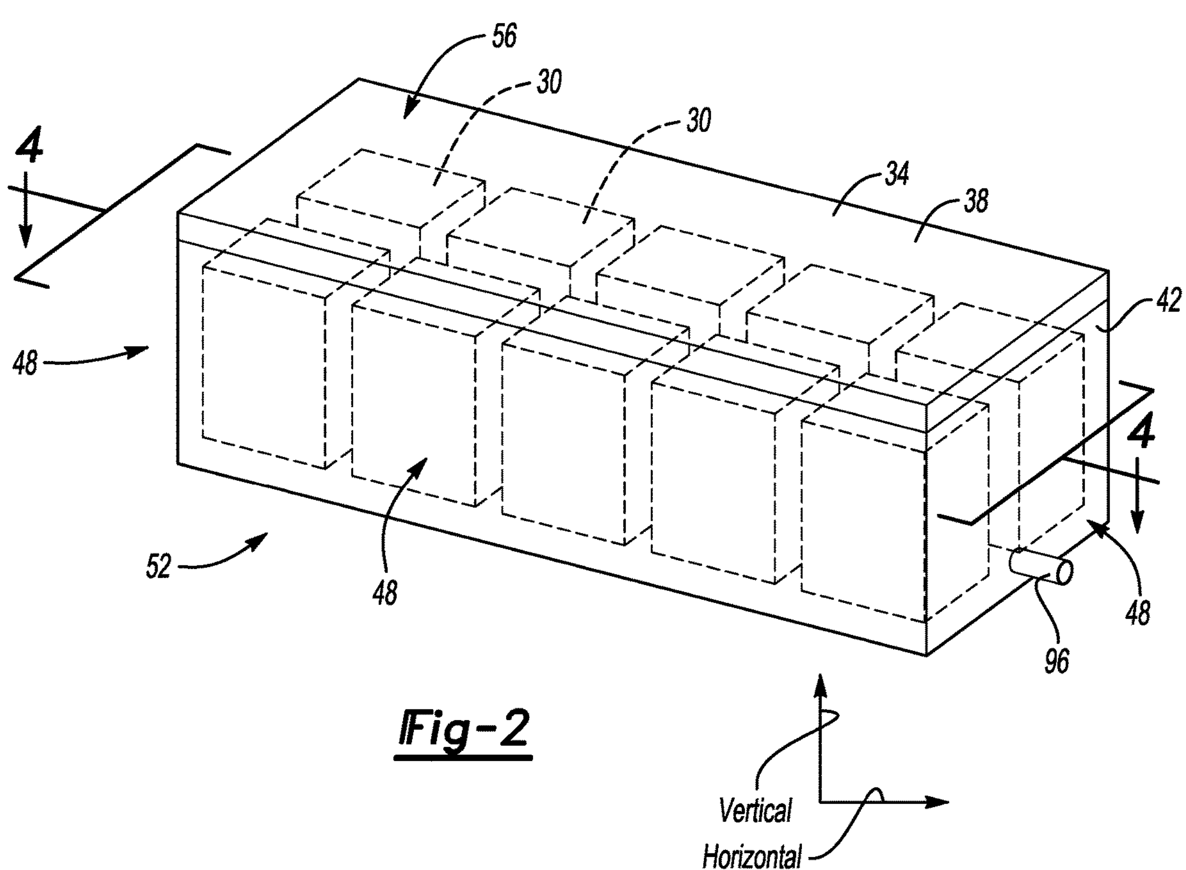
FIG. 2 illustrates a perspective view of a battery pack from the electrified vehicle of FIG. 1 and schematically showing cell stacks of the battery pack.
Figures 3, 5, 5A:
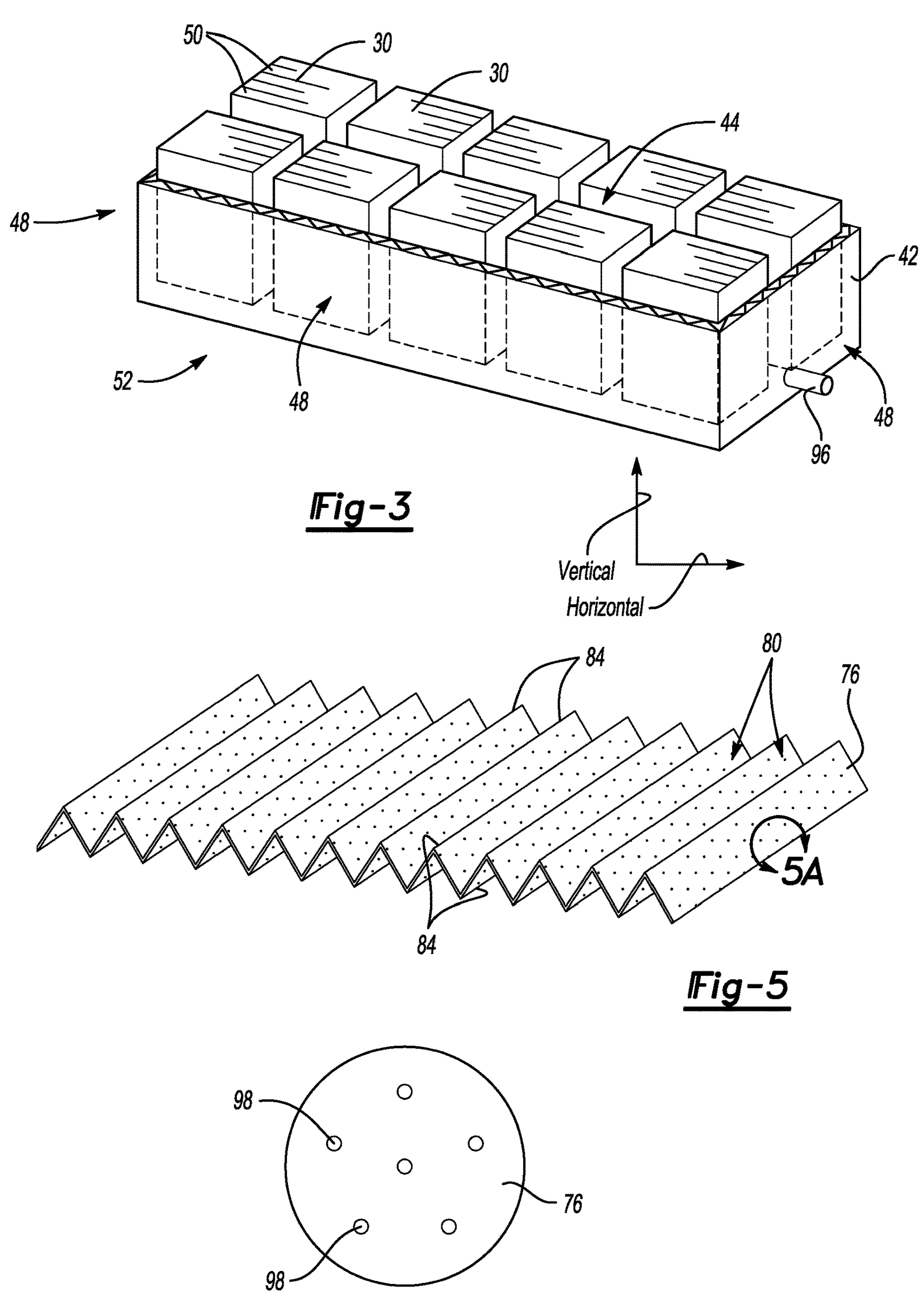
FIG. 3 illustrates the battery pack of FIG. 2 with an enclosure cover removed.
FIG. 5 illustrates a corrugated, perforated sheet that provides struts for an enclosure of the battery pack.
FIG. 5A illustrates a close-up view of an area of FIG. 5.

With reference to FIG. 1, an electrified vehicle 10 includes a battery pack 14, an electric machine 18, and wheels 22. The battery pack 14 powers an electric machine 18, which can convert electrical power to mechanical power to drive the wheels 22.

The battery pack 14 is, in the exemplary embodiment, secured to an underbody 26 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a battery pack.

With reference now to FIGS. 2-5 with continuing reference to FIG. 1, the battery pack 14 includes a plurality of cell stacks 30 held within an enclosure assembly 34. In the exemplary embodiment, the enclosure assembly 34 includes an enclosure cover 38 and an enclosure tray 42. The enclosure cover 38 is secured to the enclosure tray 42 to provide an interior area 44 that houses the cell stacks 30. The enclosure cover 38 can be secured to the enclosure tray 42 using mechanical fasteners (not shown), for example.

In the example battery pack 14, five of the cell stacks 30 are on a passenger side and five of the cell stacks 30 are on a driver side. Further, the cell stacks 30 are disposed on a single vertical tier. In other examples, the battery pack 14 could include multiple tiers of cell stacks 30.

The enclosure assembly 34 includes horizontally facing sides 48, a vertically downward facing side 52, and a vertically upward facing side 56. Vertical, for purposes of this disclosure, is with reference to ground and a general orientation of the vehicle 10 during operation.

In the example enclosure assembly 34, at least the horizontally facing sides 52 includes an inner wall 60 and an outer wall 64 that is spaced a distance from the inner wall 60 to provide an open area 68 between the inner wall 60 and the outer wall 64. The inner wall 60 and the outer wall 64 are spaced about 30 millimeters apart in this example.

A plurality of struts 72 span between the inner wall 60 and the outer wall 64 within the open area 68. The struts 72 extend longitudinally in a direction that is non-perpendicular to the inner wall 60 and the outer wall 64. The struts 72 have a zig-zag pattern.

In this example, the struts 72 are provided by a corrugated sheet of material 76. The corrugated sheet of material 76 includes a plurality of corrugations 80 that can be formed using a press. The corrugated sheet of material 76 can be metal or metal alloy. The inner wall 60 and the outer wall 64 can also be a metal or metal alloy. Apexes 84 of the corrugations 80 can be secured directly to the inner wall 60, the outer wall 64, or both to secure the struts 72. The apexes 84 can be secured using welds, for example.

Each of the cell stacks 30 includes a plurality of battery cells 50 (or simply, "cells") distributed along a respective cell stack axis. The battery cells 50 are stacked side-by-side relative to each other along the cell stack axis. The battery cells 50 store and supply electrical power. Although specific numbers of the cell stacks 30 and cells 50 are illustrated in the various figures of this disclosure, the battery pack 14 could include any number of the cell stacks 30 having any number of individual cells 50.

In an embodiment, the battery cells 50 are lithium-ion pouch cells. However, battery cells having other geometries (cylindrical, prismatic, etc.) other chemistries (nickel-metal hydride, lead-acid, etc.), or both could alternatively be utilized within the scope of this disclosure.

The example battery pack 14 includes ten cell stacks 30. A vent passageway 86 is positioned between the cell stacks 30. The vent passageway 86 is provided between two thin metal plates 54 in this example.

From time to time, pressure and thermal energy within one or more of the battery cells 50 can increase. The pressure and thermal energy increase can be due to an overcharge condition, for example. The pressure and thermal energy increase can cause the associated battery cell 50 to rupture and release vent byproducts, such as gas and debris, from within the battery cell 50.

Figure 4:
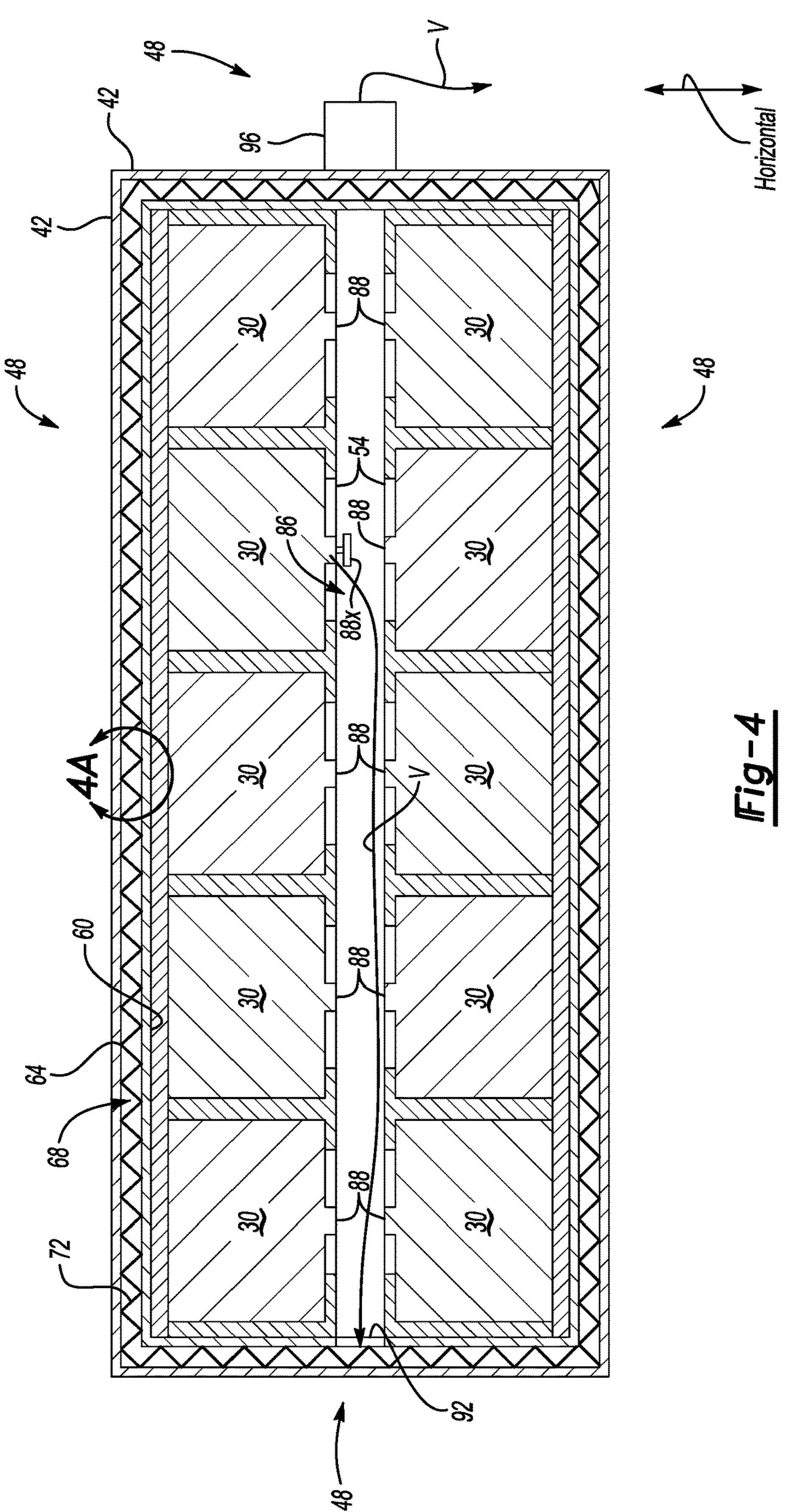
FIG. 4 illustrates a section view taken at line 4-4 in FIG. 2.
Figure 4A:
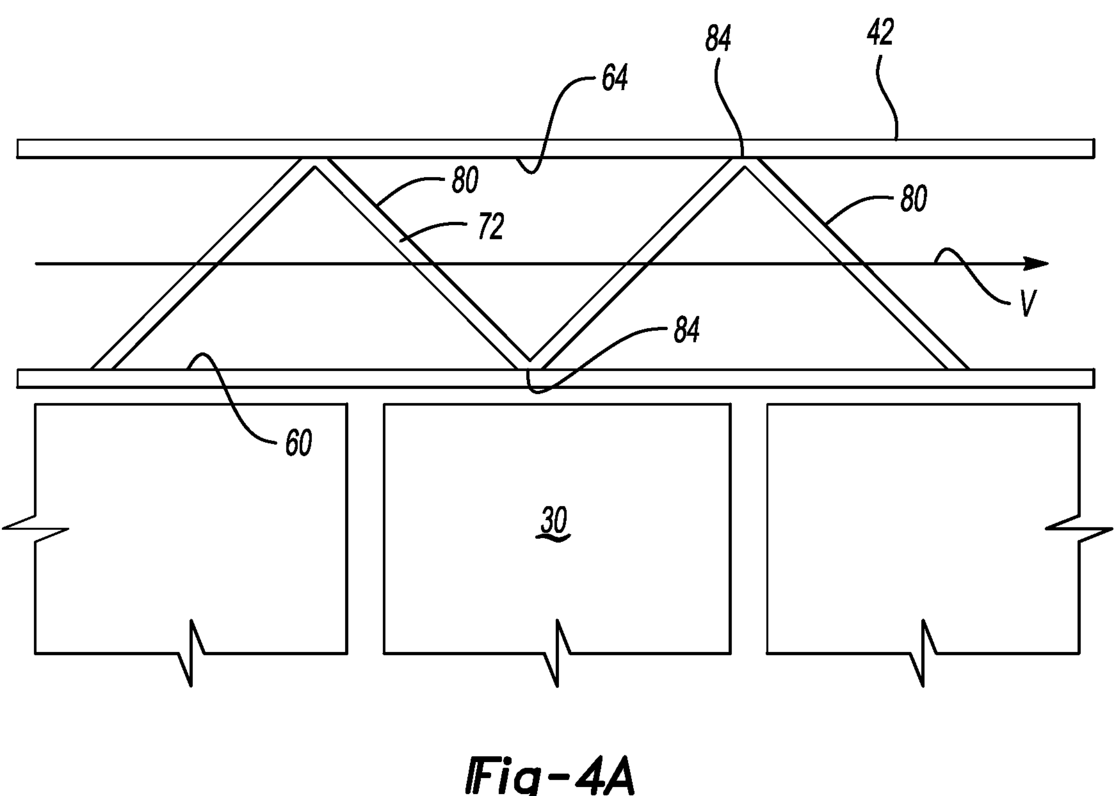
FIG. 4A illustrates a close-up view of an area of FIG. 4.

The vent byproducts can be released from the associated battery cell 50 through a designated cell stack vent 88 into the vent passageway 86. The cell stack vents 88 can be pressure activated valves, for example. The cell stack vents 88 can open in response to a pressure within a given cell stack 30 exceeding a threshold pressure, say 5 kilopascals. In FIG. 4, cell stack vent 88X is releasing vent byproducts V into the vent passageway 86.

In this example, the inner wall 60 includes an inner vent 92. The vent byproducts released from one or more of the cell stacks 30 flows into the vent passageway 86 and then through the inner vent 92 into the open area 68 between the inner wall 60 and the outer wall 64.

The outer wall 64 includes an outer vent 96. The vent byproducts can move through the open area 68 to the outer vent 96. The vent byproducts are expelled from the battery pack 14 through the outer vent 96.

As can be appreciated, the inner vent 92 is on a first side of the enclosure assembly 34 and the outer vent 96 is on an opposite, second side of the enclosure assembly 34. In this example, the outer vent 96 opens to a rear of the vehicle 10.

The vent byproducts V substantially communicate along a length of the battery pack 14 within the open area 68 prior to the vent byproducts V being expelled from the battery pack 14. The vent byproducts V cool somewhat when communicating through the open area 68 from the inner vent 92 to the outer vent 96. Thus, the temperature of the vent byproducts V when expelled from the battery pack 14 after communicating through the open area 68 is less than what the temperature would be if the vent byproducts V were expelled directly from the battery pack 14 without communicating along the length of the battery pack 14. Reducing a temperature of the vent byproducts V prior to expelling the vent byproducts from the battery pack can be desirable to reduce an intensity of thermal energy that is introduced to the ambient area due to the vent byproducts V.

Referring again the struts 72, the struts 72 can include perforations 98 to permit flow of vent byproducts within the open area 68. The areas including the perforations 98 can be spaced from the apexes 84. The vent byproducts can pass through the perforations 98 when communicating from the inner vent 92 to the outer vent 96.

Cooling the vent byproducts communicating through the open area 68 to the outer vent 96 can be further enhanced by turbulence associated with the vent byproducts flowing over the zig-zag configuration of the struts 72 and through perforations 98 in the struts 72.

Figure 6:
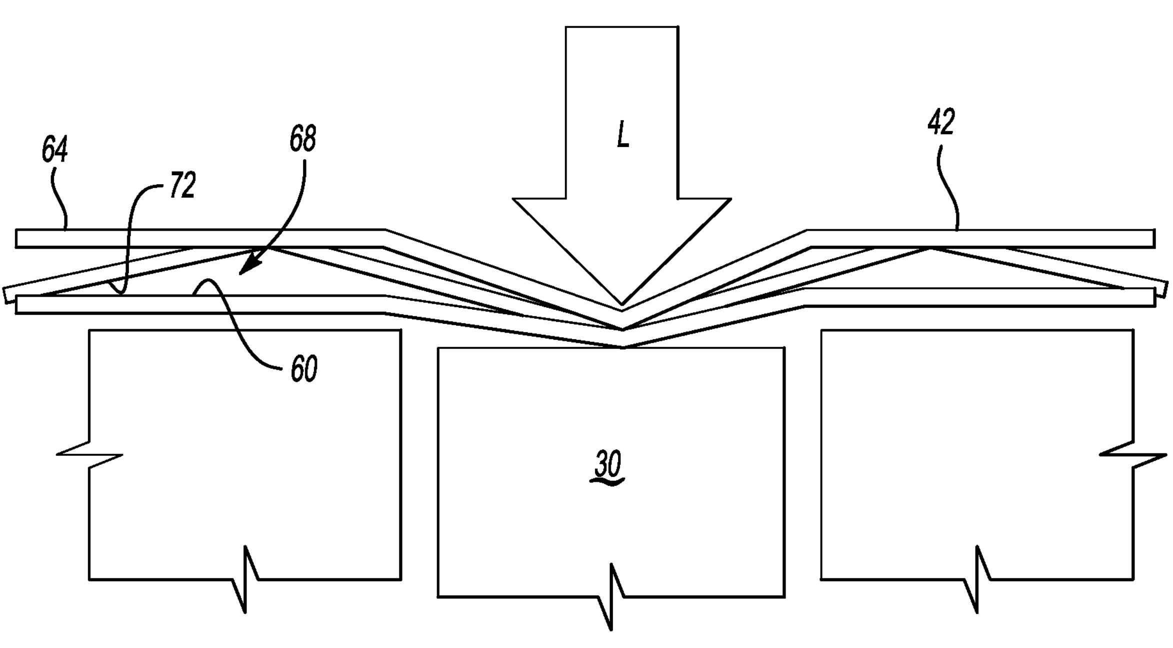
FIG. 6 illustrates the area of FIG. 4 after application of a load, such as a side load.

As shown in FIG. 6, the double-wall provided by the inner wall 60 and the outer wall 64 along with the struts 72 can, in some examples, help to reduce loads being applied to the battery cells 50. When a load L is applied to the outer wall 64, such as a side load, the struts 72 redirect at least some of the load forward in the vehicle 10 and rearward in the vehicle 10. This can help to reduce loads on the cell stacks 30.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery pack assembly, comprising:
an enclosure assembly that houses a plurality of battery cells, the enclosure assembly having an inner wall and an outer wall spaced from the inner wall; and
a plurality of perforated struts spanning between the inner wall and the outer wall.

2. The traction battery pack assembly of claim 1, wherein the plurality of struts extend non-perpendicularly from the inner wall and the outer wall.

3. The traction battery pack assembly of claim 1, wherein the plurality of struts are provided by a corrugated sheet of material.

4. The traction battery pack assembly of claim 3, wherein the corrugated sheet of material is perforated.

5. The traction battery pack assembly of claim 3, wherein the corrugated sheet of material is secured directly to the inner wall and the outer wall.

6. The traction battery pack assembly of claim 3, wherein the corrugated sheet of material is welded to the inner wall and the outer wall.

7. The traction battery pack assembly of claim 1, further comprising a plurality of cell stacks held within the enclosure assembly.

8. The traction battery pack assembly of claim 1, wherein the enclosure assembly includes an enclosure cover secured to an enclosure tray, wherein the inner wall and the outer wall are portions of the enclosure tray.

9. The traction battery pack assembly of claim 1, further comprising an inner vent provided within the inner wall, the inner vent configured to communicate vent byproducts from at least one battery cell within the plurality of battery cells to a venting passageway between the inner wall and the outer wall.

10. The traction battery pack assembly of claim 9, further comprising an outer vent provided in the outer wall, the venting passageway configured to communicate the vent byproducts from the inner vent to the outer vent.

11. The traction battery pack assembly of claim 10, wherein the inner vent and the outer vent are on opposite sides of the enclosure assembly.

12. A method of enclosing battery cells within a battery pack, comprising:
communicating vent byproducts to an open area between an inner wall of a battery pack enclosure and an outer wall of the battery pack enclosure;
spanning across the open area from the inner wall to the outer wall with a plurality of struts; and
communicating the vent byproducts through a plurality of perforations in the plurality of struts.

13. The method of claim 12, wherein the vent byproducts are released from at least one battery cell housed within the battery pack enclosure.

14. The method of claim 12, further comprising receiving the vent byproducts within the open area from an inner vent within the inner wall, and expelling the vent byproducts from the open area through an outer vent within the outer wall.

15. The method of claim 14, wherein the inner vent and the outer vent are on opposite sides of the battery pack enclosure.

16. A traction battery pack assembly, comprising:
an enclosure assembly that houses a plurality of battery cells, the enclosure assembly having an inner wall and an outer wall spaced from the inner wall; and
a corrugated sheet of material spanning between the inner wall and the outer wall, the corrugated sheet of material having a plurality of corrugations, apexes of the corrugations contacting the inner wall and apexes of the corrugations contacting the outer wall.

17. The traction battery pack assembly of claim 16, wherein the corrugated sheet of material is perforated.

18. The traction battery pack assembly of claim 17, further comprising an inner vent provided in the inner wall and an outer vent provided in the outer wall, wherein vent byproducts pass through perforations in the corrugated sheet of material when the vent byproducts are communicated from the inner vent to the outer vent.

19. The traction battery pack assembly of claim 16, wherein the corrugations extend non-perpendicularly between the inner wall and the outer wall.

20. The traction battery pack assembly of claim 16, wherein the apexes of the corrugations are welded to at least one of the inner wall and the outer wall.

* * * * *